United States Patent Office 3,449,468
Patented June 10, 1969

3,449,468
METHOD OF REDUCING POROSITY AND PIN-HOLES IN UNSATURATED POLYESTER RESIN COATINGS
Stephen R. Vrotney, Natrona Heights, and John R. Kutchko, Cheswick, Pa., assignors to PPG Industries, Inc., a corporation of Pennsylvania
No Drawing. Filed Jan. 20, 1967, Ser. No. 610,492
Int. Cl. C08f 43/08; C09d 3/66
U.S. Cl. 260—862     13 Claims

ABSTRACT OF THE DISCLOSURE

A method of reducing the porosity of a thermosetting unsaturated polyester resin composition, such that films prepared therefrom in a thickness in excess of 0.005 inch are substantially free of entrapped air bubbles, which consists of adding to the composition small amounts of an alkyl acrylate polymer wherein the alkyl radical contains from about 1 to 18 carbon atoms; and thermosetting unsaturated polyester resin compositions containing such additive. Typical alkyl acrylates for use in preparing the polymeric material include 2-ethylhexyl acrylate and butyl acrylate.

BACKGROUND OF THE INVENTION

This invention relates to a method of decreasing the porosity of polyester compositions and, more particularly, to the reduction or elimination of pitting and related defects which occur in porous layers of such compositions when applied in thicknesses in excess of about 0.005 inch.

Polyester compositions, especially those prepared from ethylenically unsaturated polyester resins, have been widely employed in molding and casting applications, as well as in coating compositions. When used in layers of thickness in excess of about 0.005 inch, however, as is the requirement in most molding operations, difficulty in obtaining weather- and chemical-resistance and an acceptable surface appearance has arisen. A primary cause of this problem has been porosity, or entrapment of air, in the composition, with resultant pitting on pinhole impairment of the cured layer. Pinholes or pits are tiny air bubbles which, by surface tension phenomena, become entrapped in the cured coating. As a result, not only is the surface of the cured layer marred by this defect, but, also, there occurs within the film similar impairment.

Numerous materials, including a wide variety of film leveling agents, such as those commonly employed in paints, have been examined as to their ability to reduce the porosity of thick layers of polyester compositions. The results, however, have generally been unsatisfactory. Thus, although this impairment is similar to film leveling problems in paint, since both relate to surface tension phenomena, it is evident that significant differences remain, as indicated by the overall unacceptability of such leveling agents.

Film leveling, and related flow problems, are a primary concern with respect to thin films of coating compositions, such as paint films. But where thick layers of a composition are applied, leveling is usually of minor concern, due to the effect of the substantial thickness of the film itself. Offsetting this beneficial characteristic, however, has been the accompanying disadvantage of excessive porosity, with the resultant film impairments described above. At present, this defect has not in any way been remedied by utilization of materials designed for improving flow or film leveling in paints or similar thin layers of compositions.

SUMMARY OF THE INVENTION

It has now been discovered that the porosity of thick layers, such as those in excess of about 0.005 inch, of a polyester composition can be eliminated or greatly reduced, without adversely affecting the characteristics of films produced therefrom, by employing in combination with the composition small amounts of a polyacrylate wherein the esterifying group is an alkyl radical of from about 1 to about 18 carbon atoms.

The polyacrylates are particularly valuable in reducing the porosity of ethylenically unsaturated polyester resin compositions which are to be applied, as thick layers, in a variety of molding applications. For example, a gel coat, which consists of a surface layer of unreinforced resin applied to a mold prior to the laying in place thereon of consecutive plies of base material, and which is removed with the cured article, forming a surface thereon, constitutes an especially valuable application of these materials. This overlay resin, usually formulated with thioxotropic fillers and pigments, is widely employed to provide decorative, protective, glossy, colored exterior surfaces requiring little or no finishing. Specific applications include coatings for forming tools, boat hulls, swimming pools and the like.

Similarly, the polyacrylates offer advantages when used in backup coatings, which are resin compositions, usually reinforced, applied after the gel coat in molding applications to provide strength for the plastic article. Another valuable application for such additives is in the production of body putties. Commonly known as patching resins, these materials are utilized in the repair and maintenance of many types of articles, including automobiles, boats, and similar metallic, plastic, and wood articles.

Numerous other applications capable of benefiting from the use of the polyacrylates of this invention will immediately become obvious to skilled workers in this field since porosity is a significant problem wherever thick layers of polyester resin compositions are employed. Thus, such additives are valuable in polyester resin compositions employed as coatings on metal surfaces such as steel or aluminum.

As has been mentioned above, unsaturated polyester resin compositions, used in thicknesses within the scope of this invention, and which are prepared using film leveling agents or similar conventional materials, often are marred by substantial pitting. In many cases, pitting is present to the extent that a backup coating will show through the surface coat. Often, if a light source is placed on one side of the article, it is possible for rays to penetrate through the pinholes formed in the surface layer. The resulting loss in desirable film properties is obvious. As a result of the significant reduction of porosity achieved by the use of the polyacrylates of this invention, it is possible to obtain coatings of excellent surface appearance, improved weather- and water-resistance, and superior finishing and refinishing ability.

Additionally, compositions prepared utilizing the polyacrylates of this invention can be readily applied by all conventional techniques, such as dip coating, brushing, roller coating, knife coating, spraying and the like. Since roller or knife coating and spraying have in the past been especially susceptible to the introduction of air bubbles into thick layers of a polyester resin composition, in the absence of materials as disclosed in this invention, it is seen that such compounds are of yet greater applicability and importance.

DESCRIPTION OF THE PREFERRED EMBODIMENTS

The polyacrylates which can be utilized according to this invention include all alkyl acrylate polymers wherein the alkyl radical contains from about 1 to 18 carbon atoms, preferably from about 2 to 12 carbon atoms. Included within a broad group of monomers available for the preparation of such polyacrylates are: 2-ethylhexyl acrylate, lauryl acrylate, propyl acrylate, amyl acrylate, butyl acrylate, n-octyl acrylate and the like, as well as copolymers prepared from the various monomeric materials.

In addition to the utilization of the above monomeric materials, such alkyl acrylate polymers can also be prepared employing minor amounts of other copolymerizable monomers. For example, a copolymer of 2-ethylhexyl acrylate and butyl methacrylate is completely satisfactory for the purpose described. Usually, however, it is preferred to employ methacrylates, as well as any other copolymerizable monomers, in amounts of less than about 30 percent by weight of the polymer.

The polyacrylates are conventionally prepared, the reaction conditions ordinarily being noncritical. Thus, the materials can be obtained by emulsion polymerization, solution polymerization, or suspension polymerization. For example, the materials are readily obtained by means of solution polymerization, wherein the monomer or monomers are refluxed in a solvent or mixture of solvents, usually aliphatic or aromatic hydrocarbon solvents, such as kerosene, butanol, xylene, benzene and the like, until polymerization proceeds to form a polymer having a desired viscosity.

In carrying out the polymerization reaction, a catalyst is ordinarily utilized. Included among such materials are peroxygen type catalysts, such as butylperoxy isopropyl carbonate, acetyl benzoyl peroxide, methyl ethyl ketone peroxide, and the like, and diazo compounds such as alpha,alpha-azo-di-isobutyronitrile or p-methoxyphenyl diazothio-(2-naphthyl)ether and the like. The quantities of catalysts employed is subject to wide variation but in most instances it is desirable to use from about 0.1 percent to about 5 percent, based upon the weight of the monomers, charged into the polymerization reaction.

The thermosetting unsaturated polyester resin compositions to which the polyacrylates of this invention are added comprise a wide variety of products prepared by admixing polymerizable ethylenically unsaturated compounds and an unsaturated polyester which is the esterification product of alpha,beta-ethylenically unsaturated dicarboxylic acids and polyhydric alcohols. All conventional unsaturated polyester resins are contemplated as being within this class.

The ethylenically unsaturated dicarboxylic acid may include such acids as maleic acid, fumaric acid, aconitic acid, and the like, as well as alkyl derivatives of such acids. The anhydrides of these acids, where the anhydrides exist, are, of course, embraced under the term "acid," since the reaction products obtained therefrom, that is, the polyesters, are essentially the same.

Saturated or aromatic dicarboxylic acids may also be utilized in conjunction with the unsaturated acid in the preparation of the unsaturated polyester resins. Such acids increase the length of the polyester without adding additional cross-linking sites, a desired feature in some polyesters. Examples of such dicarboxylic acids include: succinic acid, adipic acid, suberic acid, phthalic acid, isophthalic acid, and the like. The anhydrides of these acids, where the anhydrides exist, are, of course, embraced in the term "acid."

For the purposes of the present invention, the aromatic nuclei of such acids as phthalic acid are regarded as saturated since the double bonds do not react by addition, as do ethylenic groups.

The ethylenically unsaturated dicarboxylic acids are conventionally employed in an amount of about 10 mole percent to about 100 mole percent, although preferably in an amount of about 20 mole percent to about 80 mole percent, of the total moles of acid components in the polyester.

Any of a wide number of conventionally used polyhydric alcohols can be employed in preparing the unsaturated polyester resins. Typical polyols include, for example, ethylene glycol, diethylene glycol, triethylene glycol, polyethylene glycol, propylene glycol, glycerol, trimethylol propane and the like.

The polyhydric alcohols can be employed in an equal molar ratio to the total acid components, although it is conventional practice to include a slight excess of polyol, for example, about 5 mole percent.

Polymerizable ethylenically unsaturated monomers which cross-link with unsaturated polyesters to form thermosetting unsaturated polyester resins include such monomers as styrene, divinyl benzene, diallyl phthalate, allyl acetate and the like. Usually, liquid monomers, soluble in the polyester components, such as styrene and vinyl toluene, are preferred. Such monomers should preferably be free of nonaromatic carbon-carbon conjugated double bonds.

The monomer component or components may be employed over a broad range, but usually the proportion thereof, upon a weight basis, will be less than the polyester component. The amount of monomer should be sufficient to provide a liquid, flowable, interpolymerizable mixture. Usually, the percentage of monomer will fall within the range of about 10 percent to about 60 percent by weight of the total mixture of polyester and monomer. At the preferred range, the monomer is utilized in the amount of about 20 percent to about 50 percent.

Since the monomer is usually added at high temperatures, it is preferred to include a polymerization (gelation) inhibitor in the system. Suitable inhibitors include quinonic or phenolic class materials or compounds selected from a group of quaternary ammonium salts and salts of amines, particularly amine halide salts. Examples of these are: hydroquinone, methyl hydroquinone, chlorohydroquinone, trimethylamine hydrochloride, triethylamine, hydrochloride, and the like.

The gelation inhibitor remains in the solution of unsaturated polyester-interpolymerizable monomer and acts as an inhibitor of gelation during subsequent storage of the material before the latter is actually used. The amount of inhibitor required in the mixture during the mixing stages is susceptible to wide variations, but preferably is in a range of about 0.01 percent to about 0.1 percent by weight, based upon the polyester component of the mixture.

When the interpolymerizable mixture is to be employed in a gel coat composition or a backup coating composition or in other compositions in accordance with the provisions of the present invention, there is usually employed a polymerization catalyst, conventionally a free-radical catalyst, which is an organic peroxide, organic hydroperoxide, or an ester thereof and which is usually activated by an accelerator. Typical organic peroxides include benzoyl peroxide, acetyl peroxide, lauryl peroxide, butylperoxy isopropyl carbonate and the like. Organic hydroperoxides include, for example, cumene hydroperoxide, tertiary butyl hydroperoxide, methyl ethyl ketone peroxide, and the like.

For a thorough discussion of unsaturated polyester resin preparation, raw materials therefor, and appropriate polymerization catalysts, inhibitors, accelerators and the like, see "Polyesters and Their Applications," by Bjorksten, Reinhold Publishing Corporation (1956), especially pages 21 to 73.

The polyacrylate, in undiluted form, or as a solution in an aliphatic or aromatic hydrocarbon solvent or any other suitable solvent, can be readily combined with any of the above-described polyester resins by mixing or blending together of the two materials. Preferably, the polyacrylate is added to the resin when the latter material is formulated into a final composition, such as a gel coat or backup resin composition, when additional conventional materials such as pigments, dyes, inert fillers, additives, reinforcements, flame retardant additives, wax, lubricants, and the like are included in the composition.

The polyacrylate is usually employed in small amounts, such as from 0.01 percent to 1 percent, and preferably from 0.1 percent to 0.25 percent, of the total weight of the polyester resin, based on resin solids.

The following examples illustrate in detail a method of practicing the instant invention. The examples are not intended to limit the invention, however, for there are, of course, numerous possible modifications and variations.

of porosity. The panels were then immersed in boiling water for 2 hours to determine water resistance. Poor water resistance is evidenced by blushing of the film.

Similarly, four panels were coated as above except that they were cured at 130° F. for about 1 hour instead of room temperature. They were then subjected to the same tests. The results of all the above tests are given in table below:

TABLE

| Composition | Room temperature cure (77° F.), one hour | | 130° F. oven cure, one hour | |
|---|---|---|---|---|
| A (containing poly-2-EHA) | Smooth | No blush | Smooth | No blush. |
| B (containing poly-2-EHA) | do | do | do | Do. |
| C (not containing poly-2-EHA) | Spotty | Blush | Spotty | Blush. |
| D (not containing poly-2-EHA) | do | do | do | Do. |

Examples 1–2

Poly(2-ethylhexyl acrylate) was prepared according to the following procedure: To a two-liter reaction vessel, previously charged with 125 parts of butanol and 125 parts of xylene, was added over a continuous period of two hours 500 parts of 2-ethylhexyl acrylate. After the addition of the monomer was completed, the mixture was refluxed for 6 hours at a temperature of approximately 117° C. in the presence of 0.5 part of butylperoxy isopropyl carbonate and 25 parts of xylene. Additional increments of butylperoxy isopropyl carbonate were added after the second and fourth hours of polymerization in equivalent 25 part portions of xylene. The resulting product had a percent solids of 62.4 and a viscosity (Gardner-Holdt) of B+.

Compositions A and B, corresponding to Examples 1–2 and utilizing the above prepared poly(2-ethylhexyl acrylate), designated poly-2-EHA, were compared with Compositions C and D, which were of the same respective formulations except that they contained no poly(2-ethylhexyl acrylate).

Composition A was prepared according to conventional formulating procedures by mixing together the following components.

COMPOSITION A

| Components: | Parts by wt. |
|---|---|
| Polyester resin [1] | 100 |
| Styrene | 20 |
| Anhydrous silica | 1.75 |
| Cobalt naphthanate (6% cobalt) | 0.6 |
| Methyl ethyl ketene peroxide | 1.2 |
| Methyl hydroquinone | 0.03 |
| Paraffin wax [2] | 2.4 |
| Poly(2-ethylhexyl acrylate) | 0.18 |

[1] The polyester resin was prepared, according to standard procedures, by blending together the polyesterification product of 6.0 moles of phthalic anhydride, 4.0 moles of maleic anhydride, 8.3 moles of diethylene glycol, and 2.8 moles of propylene glycol with styrene and hydroquinone, in the ratio of 77:23:0.02. The polyester utilized had an acid number of 29 and a viscosity (Gardner-Holdt) of Z2+.

[2] The paraffin wax comprised a 2.5:1 mixture of a high-melting point paraffin wax (melting point 150° F.) and a low melting point wax (melting point 125° F.).

Composition B was formulated as above except that an equivalent amount of hydroquinone was substituted for the methyl hydroquinone utilized in the polyester resin of Composition A. As noted, Compositions C and D were prepared as above. That is, except for the absence of poly(2-ethylhexyl acrylate) in such compositions, Composition C corresponds to Composition A and Composition D corresponds to Composition B.

To each of four panels, consisting of untreated steel strips having dimensions of 3″ by 12″ by ⅛″, there was applied, by means of a drawdown bar, an .02 inch thick layer of one of the above compositions. The panels were then cured at room temperature, 77° F., and examined by a lighted magnifying glass to determine the condition of the film surface. A smooth surface indicates little or no porosity in the composition, whereas a spotty or pitted surface indicates an unacceptably high amount

Example 3

A polyacrylate comprising 90 percent by weight of 2-ethylhexyl acrylate and 10 percent by weight of butyl methacrylate was prepared according to the procedure of Examples 1–2. The copolymer was prepared as a solution in butanol and xylene, employed in a 42:58 parts by weight ratio. The mixture had a percent solids of 62.3, at 150° C., and a viscosity (G-H) of F-G.

The above polyacrylate was added, in an amount of 0.2 percent by weight of the composition, to a polyester resin composition prepared from a blend of a polyester resin and styrene in a 65:35 parts by weight ratio. The polyester employed contained 6 moles of maleic anhydride, 4 moles of phthalic anhydride, and 10.3 moles of dipropylene glycol. The polyester utilized had an acid number of 25–35 and a viscosity of I–J.

This composition was applied, by means of a drawdown bar, to a steel panel in a 0.015 inch thickness. The panel was cured at a temperature of 77° F. for about 1 hour, yielding a nontacky, smooth-surfaced coating.

Example 4

A polyacrylate comprising butyl acrylate was prepared according to the procedure described in Examples 1–2. The polymer was prepared as a solution in butanol and xylene, utilized in a 42:58 parts by weight ratio. The polyester utilized had a per cent solids of 62.5, at 150° C., and a viscosity (G-H) of B.

The above polyacrylate was added, in an amount of 0.2 percent by weight of the composition, to a polyester resin composition substantially identical to that employed in Example 3. This composition was then applied, by means of a drawdown bar, to a steel panel in a 0.015 inch thickness and cured at 77° F. for about 1 hour. The surface of the coated panel was smooth and nontacky, indicating a generally overall lack of porosity in the cured coating composition.

Although specific examples of the instant invention have been set forth hereinabove, it is not intended that the invention be limited solely thereto, but to include all the variations and modifications following within the scope of the appended claims. Polyacrylates prepared from monomeric materials other than those utilized in the examples, such as lauryl acrylate or n-octyl acrylate, are also completely suitable. And, as mentioned above, homopolymers, as well as copolymers of the described alkyl acrylates, may be utilized according to this invention, since such additives all function to reduce porosity in polyester resin compositions.

We claim:
1. A method of reducing the porosity of a layer of an unsaturated polyester resin composition of (1) an ethylenically unsaturated polyester of an ethylenically unsaturated dicarboxylic acid and (2) a polyhydric alcohol and a polymerizable ethylenically unsaturated monomer which comprises adding to said polyester resin composition from about 0.01 percent to about 1 percent by weight of the polyester resin composition, based on resin solids of an alkyl acrylate polymer wherein the alkyl radical contains from about 2 to about 18 carbon atoms.

2. The method of claim 1 wherein the alkyl radical contains from about 2 to 12 carbon atoms.

3. The polyester resin composition of claim 1 wherein the polymerizable ethylenically unsaturated monomer is styrene.

4. The method of claim 1 wherein the alkyl acrylate polymer is poly(2-ethylhexyl acrylate).

5. The method of claim 1 wherein the alkyl acrylate polymer is a copolymer of 2-ethylhexyl acrylate and butyl methacrylate.

6. The method of claim 1 wherein the alkyl acrylate polymer is poly(butyl acrylate).

7. A thermosetting ethylenically unsaturated polyester resin composition comprising:
   (1) an ethylenically unsaturated polyester resin of an ethylenically unsaturated dicarboxylic acid and a polyhydric alcohol;
   (2) a polymerizable ethylenically unsaturated monomer; and
   (3) an alkyl acrylate polymer wherein the alkyl radical contains from about 2 to about 18 carbon atoms and wherein the amount of alkyl acrylate polymer is from about 0.01 to about 1 percent by weight of the polyester resin composition based on resin solids.

8. The composition of claim 7 wherein the alkyl radical contains from about 2 to 12 carbon atoms.

9. The composition of claim 7 wherein the alkyl acrylate polymer is poly(2-ethylhexyl acrylate).

10. The composition of claim 7 wherein the alkyl acrylate polymer is poly(butyl acrylate).

11. The composition of claim 7 wherein the alkyl acrylate polymer is a copolymer of 2-ethylhexyl acrylate and butyl methacrylate.

12. A cured layer of the thermosetting ethylenically unsaturated polyester resin composition of claim 7, the layer having a thickness in excess of about 0.005 inch.

13. An article comprising a metal surface having thereon as an adherent coating the composition of claim 7.

References Cited

UNITED STATES PATENTS

| | | | |
|---|---|---|---|
| 2,757,160 | 7/1956 | Anderson | 260—862 |
| 3,389,192 | 6/1968 | Ziegler | 260—862 |

SAMUEL H. BLECH, *Primary Examiner.*

JOHN T. GOOLKASIAN, *Assistant Examiner.*

U.S. Cl. X.R.

117—161, 132; 260—28.5